United States Patent
Hisaminato et al.

(10) Patent No.: US 12,403,859 B2
(45) Date of Patent: Sep. 2, 2025

(54) SIDE AIRBAG DEVICE AND AIRBAG FOLDING METHOD

(71) Applicant: TOYODA GOSEI CO., LTD., Kiyosu (JP)

(72) Inventors: Kazuki Hisaminato, Kiyosu (JP); Koji Shibayama, Kiyosu (JP); Yuta Okayama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/999,261

(22) Filed: Dec. 23, 2024

(65) Prior Publication Data
US 2025/0214528 A1    Jul. 3, 2025

(30) Foreign Application Priority Data
Dec. 27, 2023  (JP) .................................. 2023-221088

(51) Int. Cl.
*B60R 21/237*    (2006.01)
(52) U.S. Cl.
CPC .................................. *B60R 21/237* (2013.01)
(58) Field of Classification Search
CPC ............................. B60R 21/237; B60R 21/207
See application file for complete search history.

(56) References Cited

U.S. PATENT DOCUMENTS

| | | | |
|---|---|---|---|
| 9,340,174 B1* | 5/2016 | Paxton | B60R 21/231 |
| 10,000,177 B2* | 6/2018 | Mihm | B60R 21/262 |
| 11,820,317 B1* | 11/2023 | Koh | B60R 21/205 |
| 12,090,944 B2* | 9/2024 | Matsuzaki | B60R 21/207 |
| 2001/0011812 A1 | 8/2001 | Seki et al. | |
| 2009/0200776 A1* | 8/2009 | Sato | B60R 21/237 |
| | | | 280/730.2 |

FOREIGN PATENT DOCUMENTS

JP          H11-59311 A         3/1999

* cited by examiner

*Primary Examiner* — Faye M Fleming
(74) *Attorney, Agent, or Firm* — Posz Law Group, PLC

(57) ABSTRACT

The side airbag device includes an airbag in a folded state, including a pair of sheets provided facing each other, and an inflator including a supply port for supplying gas and configured to supply gas into the airbag. The airbag, with the pair of sheets deployed, includes a first portion including one end of the sheets in a first direction, a second portion including the other end, a third portion positioned between the first portion and the second portion, and a fourth portion positioned between the first portion and the third portion. The airbag is folded into a first state with the first portion and the fourth portion positioned between a pair of sheet parts corresponding to a part of the pair of sheets and included in the third portion, and further folded into a second state with a part of the pair of sheet parts arranged to sandwich the first portion and the fourth portion, folded with an accordion fold in a second direction perpendicular to the first direction. The supply port is arranged between another part of the pair of sheet parts.

7 Claims, 19 Drawing Sheets

SIDE AIRBAG DEVICE AND AIRBAG FOLDING METHOD

CROSS REFERENCE TO RELATED APPLICATIONS

The present application claims the priority based on Japanese Patent Application No. 2023-221088 filed on Dec. 27, 2023, the disclosure of which is hereby incorporated by reference in its entirety.

BACKGROUND

Field

The present disclosure relates to a side airbag device and an airbag folding method.

Related Art

A side airbag device installed in a seat of a vehicle has been known in the prior art. When the vehicle is subjected to an impact, the side airbag device deploys an airbag between an occupant seated in the seat and the closest side wall of the vehicle to the seat. With respect to the side airbag according to Japanese Patent Laid-Open Publication No. H11-59311, in the process of folding its airbag in the manufacturing stage of its side airbag device, the airbag is first folded with an accordion fold in the direction corresponding to the front-back direction of the vehicle. Thereafter, the upper end part of the airbag folded with the accordion fold is folded forward, and further folded downward. The lower end part of the airbag folded with the accordion fold is folded forward, and further folded upward. In the process of deployment of the airbag, first, the folded upper end part and the folded lower end part deploy upward and downward, respectively. Thereafter, the airbag folded with the accordion fold deploys toward the front of the vehicle. This allows the airbag to quickly cover the side part of the occupant in a vertical wide area. As a result, the occupant is surely restricted.

In the airbag according to Japanese Patent Laid-Open Publication No. H11-59311, first, the upper end part and the lower end part of the airbag deploy, and thereafter the airbag deploys forward. This causes a delay in the timing of the airbag deploying forward. The following problem also arises because the airbag deploys forward after having deployed in the up-down direction. Therefore, the upper arm of an occupant is pushed against the side part of the chest of the occupant via the airbag deployed in the up-down direction, due to the door or the wall deformed to the inside of the vehicle subjected to an external impact. As a result, the chest of the occupant is compressed by the upper arm of the occupant.

SUMMARY

The present disclosure may be embodied in the following aspects.

In one aspect of the present disclosure, a side airbag device is provided. The side airbag device includes an airbag in a folded state, including a pair of sheets provided facing each other and connected to each other, and an inflator including a supply port for supplying gas and configured to supply gas into the airbag. When the airbag is viewed along a thickness direction of the pair of sheets, with the pair of sheets deployed in a flat shape, the airbag includes a first portion including one end of the sheets in a first direction, a second portion including the other end of the sheets in the first direction, a third portion positioned between the first portion and the second portion in the first direction, and a fourth portion positioned between the first portion and the third portion in the first direction. The airbag is folded into the following states: (i) a state with at least a part of the first portion and the fourth portion positioned between a pair of sheet parts corresponding to a part of the pair of sheets and included in the third portion, and (ii) a state with a part of the pair of sheet parts arranged to sandwich the at least part of the first portion and the fourth portion, folded with an accordion fold in a second direction perpendicular to the first direction, together with the at least part of the first portion and the fourth portion. The supply port is arranged between another part of the pair of sheet parts.

DETAILED DESCRIPTION

A. Embodiment

A1. Configuration of Side Airbag Device

Figure 1:
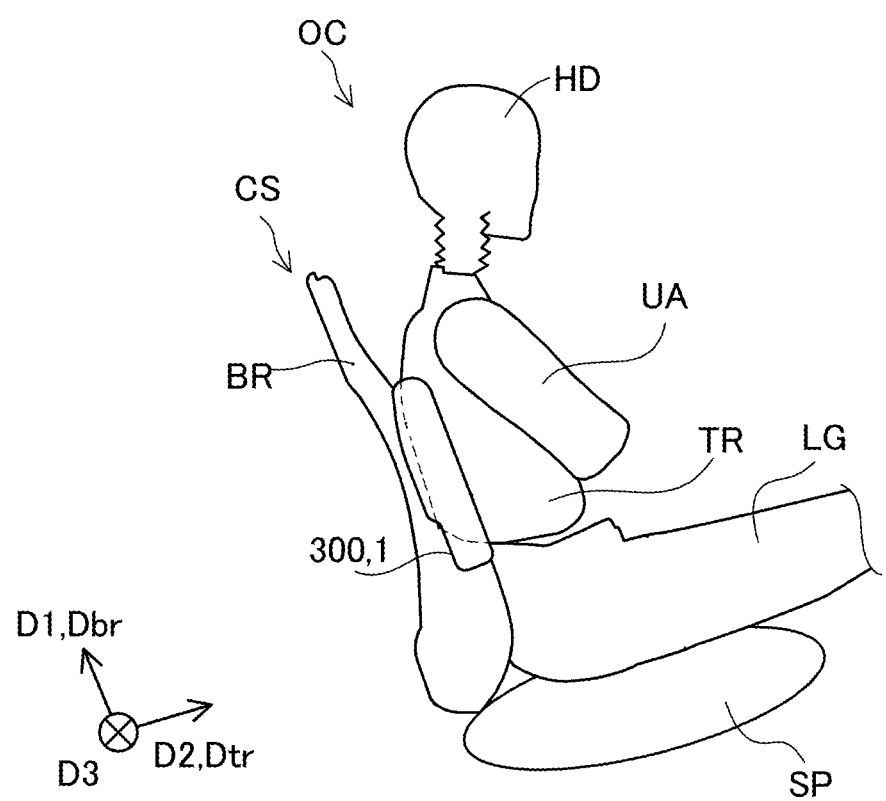
FIG. 1 is an explanatory diagram illustrating the arrangement of a side airbag device 1 as an embodiment of the present disclosure.

FIG. 1 is an explanatory diagram illustrating the arrangement of the side airbag device 1 as an embodiment of the present disclosure. The side airbag device 1 is installed in a seat CS of a vehicle (refer to the center part of the middle range in FIG. 1). The side airbag device 1 is configured to deploy the airbag 100, when the vehicle is subjected to an external impact, between an occupant OC seated in the seat CS of the vehicle and the closest side wall of the vehicle to the seat CS. The side airbag device 1, in its unused state, has an elongated outer shape. The side airbag device 1 is installed in the side part of the seat CS of the vehicle so that an extending direction Dbr of a backrest BR of the seat CS of the vehicle from a seat base SP coincides with the longitudinal direction D1 of the side airbag device 1.

The direction, which is perpendicular to the direction Dbr and where a torso TR of the occupant OC seated in the seat CS is positioned with respect to the backrest BR, is defined as a direction Dtr. For the sake of ease of technical understanding, FIG. 1 shows, as the occupant OC, a dummy of the occupant OC having a head HD, the torso TR, an upper arm UA, and a leg LG. FIG. 1 shows only the outer shape of the skeletal part of the backrest BR of the seat CS, without its cushion part.

Figure 2:
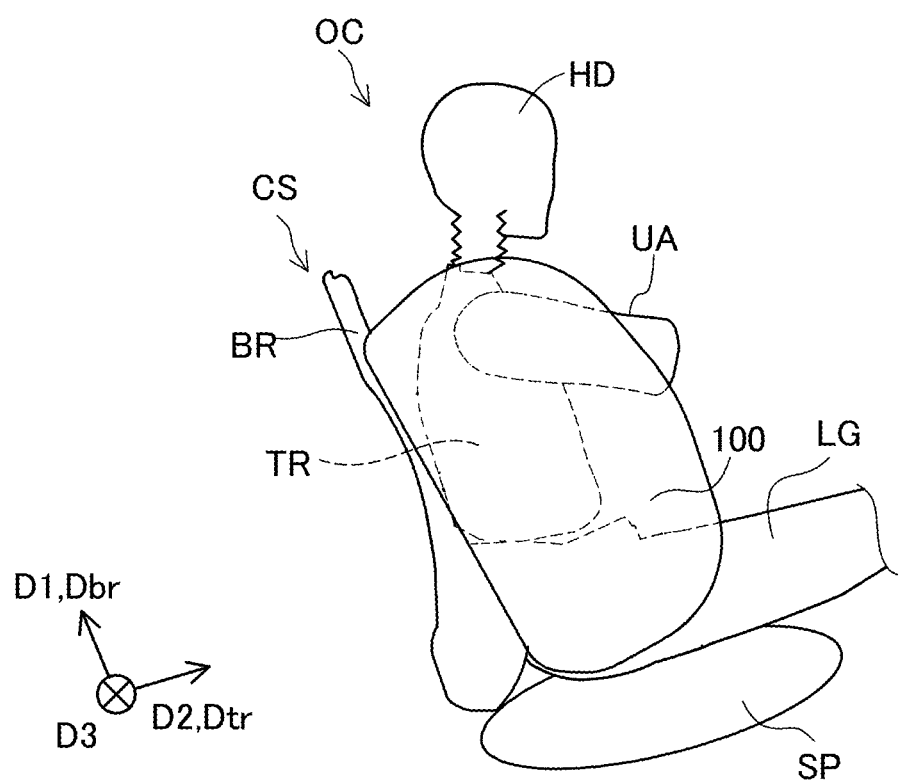
FIG. 2 is an explanatory diagram illustrating an airbag 100 when it is deployed.

FIG. 2 is an explanatory diagram illustrating the airbag 100 when it is deployed by the side airbag device 1. The side airbag device 1 includes the airbag 100, an inflator 200, and a housing bag 300. In FIG. 1, the airbag 100 and the inflator 200 are housed in the housing bag 300. For the sake of ease of technical understanding, FIG. 2 shows neither the inflator 200 nor the housing bag 300.

The airbag 100 inflates and deploys when inflation gas is supplied from the inflator 200 (refer to FIG. 2). The airbag 100 includes the pair of sheets St100, St200, which are provided facing each other and connected to each other. FIG. 1 shows the pair of sheets St100, St200 in a folded state.

The inflator 200 supplies gas into the airbag 100. When gas is supplied by the inflator 200, the airbag 100 then inflates in the direction Dtr where the torso TR is positioned with respect to the backrest BR and in the extending direction Dbr of the backrest BR (refer to FIG. 2). The inflator 200 has a cylindrical shape. The inflator 200 includes a supply port 220 for supplying gas through it. The supply port 220 is provided on one end face of the cylindrical inflator 200. A part of the inflator 200 including the one end on which the supply port 220 is provided is placed inside the airbag 100. The longitudinal direction of the cylindrical inflator 200 coincides with the longitudinal direction D1 of the side airbag device 1 before deployment. In the present specification, this direction is defined as the first direction D1. The side airbag device 1 is installed in the seat CS of the vehicle so that the supply port 220 of the inflator 200 is positioned lower than the expected position of the shoulder joint of the occupant OC (refer to FIG. 1).

The housing bag 300 houses the folded airbag 100, and the inflator 200 partially placed inside the airbag 100 (refer to the center part of the middle range in FIG. 1). The housing bag 300 reduces the possibility of foreign matter entering the inside of the side airbag device 1. When the airbag 100 deploys, the housing 300 tears. For the sake of ease of technical understanding, FIG. 2 shows neither the torn housing bag 300 nor the inflator 200.

Figure 3:
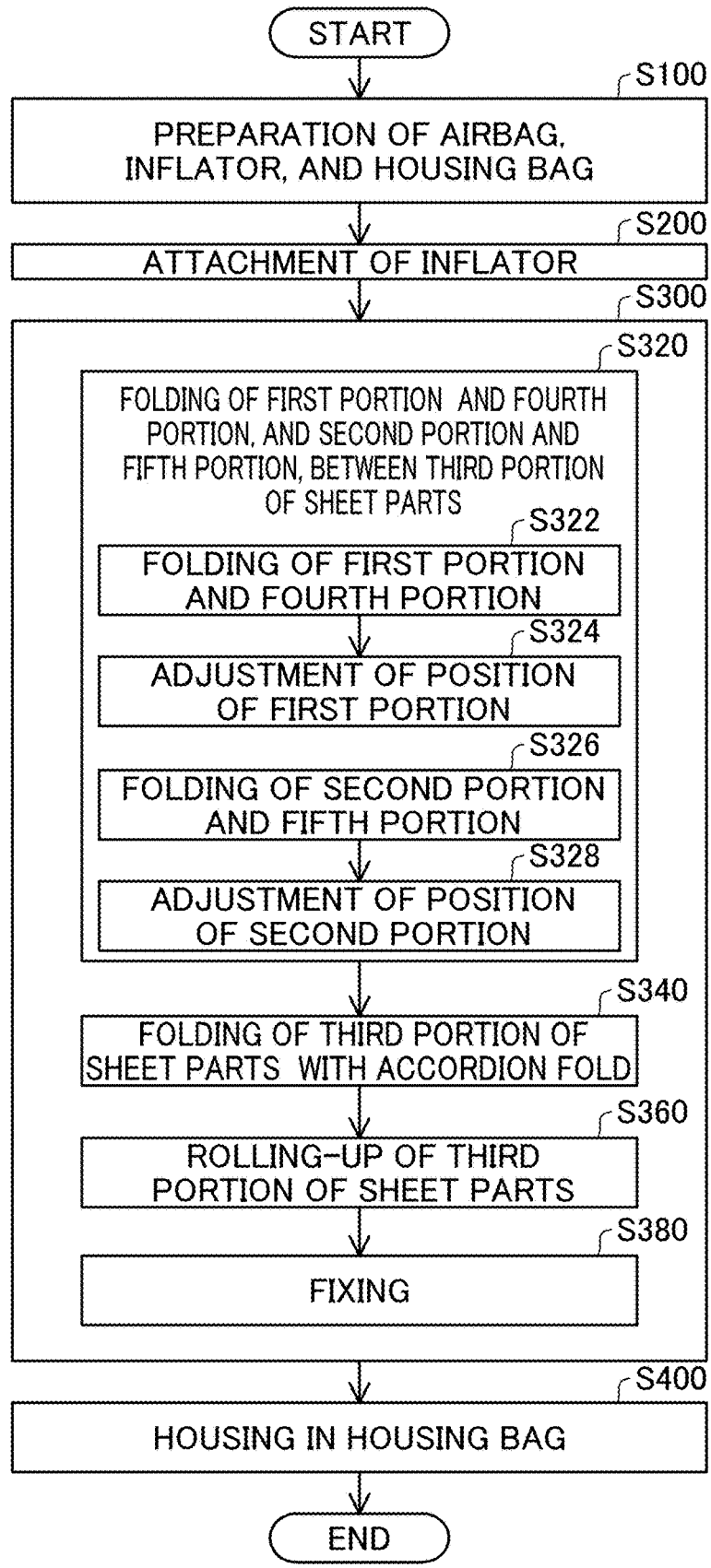
FIG. 3 is a flowchart describing the method of folding the airbag 100.

FIG. 3 is a flowchart describing the method of folding the airbag 100 included in the side airbag device 1. In step S100, the airbag 100, the inflator 200, and the housing bag 300 are prepared.

In step S200, the inflator 200 is attached to the airbag 100. More specifically, the inflator 200 is inserted into the airbag 100 through an insertion port 110 provided on the airbag 100. Thereafter, the inflator 200 and the airbag 100 are fixed to each other. The inflator 200 is partially exposed to the outside through the insertion port 110 provided on the airbag 100.

In step S300, the airbag 100 is folded.

Figure 4:
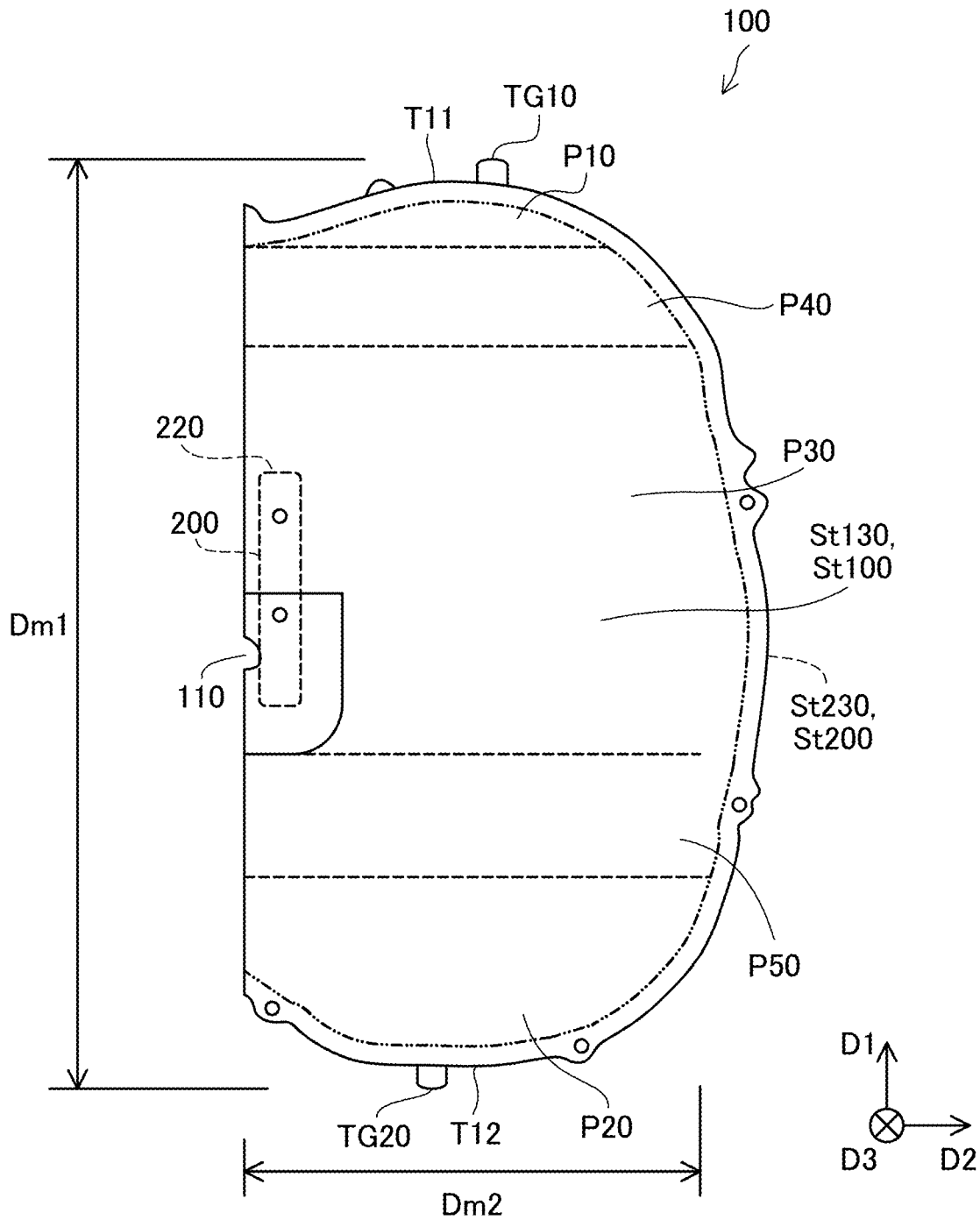
FIG. 4 shows the airbag 100 when viewed along a thickness direction D3 of a pair of a sheet St100 and a sheet St200.

FIG. 4 shows the airbag 100 when viewed along the thickness direction D3 of the pair of sheets St100, St200 included in the airbag 100 in the state where the pair of sheets St100, St200 is deployed in a flat shape. FIG. 4 to FIG. 13 are explanatory diagrams for explaining the method of folding the airbag 100, while not showing the precise shape of the airbag 100.

The sheets St100, St200 have substantially the same shape. The sheets St100, St200 are arranged to overlap, and their outer peripheries are sewn together. In FIG. 4, the sewn parts of the sheets St100, St200 are illustrated with a two-dot line. In FIG. 4, the sheet St100 is illustrated in a front side. In FIG. 4, the sheet St200 is positioned behind the sheet St100.

The direction, which is perpendicular to the longitudinal direction of the inflator 200 attached to the airbag 100, is defined as the second direction D2 (refer to the right-side part of the lower range in FIG. 4). The second direction D2 and the first direction D1 are perpendicular to each other. The second direction D2 and the first direction D1 are perpendicular to the third direction D3 which is the thickness direction D3 of the sheets St100, St200. The first direction D1, the second direction D2, and the third direction D3 form a left-handed coordinate system.

The airbag 100 has a dimension Dm1 in the first direction D1 and a dimension Dm2 in the second direction D2, where the dimension Dm1 is longer than the dimension Dm2. The airbag 100 includes a first portion P10, a second portion P20, a third portion P30, a fourth portion P40, and a fifth portion P50.

The first portion P10 is the portion including one end T11 of the sheets St100, St200 in the first direction D1 (refer to the upper range in FIG. 4). The first portion P10 includes a tag TG10 attached to it. The tag TG10 is a rectangular sheet. The tag TG10 has one end sewn to the first portion P10. The tag TG10 has a dimension in the first direction D1 shorter than the dimension Dm1 of the airbag 100. The tag TG10 has a dimension in the second direction D2 shorter than the dimension Dm2 of the airbag 100. The tag TG10 protrudes from the first portion P10 in the first direction D1.

The second portion P20 is the portion including the other end T12 of the sheets St100, St200 in the first direction D1 (refer to the lower range in FIG. 4). The second portion P20 includes a tag TG20 attached to it. The tag TG20 has the same configuration as the configuration of the tag TG10. The tag TG20 protrudes from the second portion P20 in the direction opposite to the first direction D1.

The third portion P30 is a portion positioned between the first portion P10 and the second portion P20 in the first direction D1 (refer to the right-side part of the middle range in FIG. 4). The pair of sheet parts, which is a part of the pair of sheets St100, St200 and is included in the third portion P30, is defined as sheet parts St130 and St230.

The fourth portion P40 is the portion positioned between the first portion P10 and the third portion P30 in the first direction D1 (refer to the right-side part of the upper range in FIG. 4). The fourth portion P40, when the airbag 100 deploys and inflates, is positioned to surround the first portion P10 when viewed along the direction opposite to the first direction D1.

The fifth portion P50 is the portion positioned between the second portion P20 and the third portion P30 in the first direction D1 (refer to the right-side part of the lower range in FIG. 4). The fifth portion P50, when the airbag 100 deploys and inflates, is positioned to surround the second portion P20 when viewed along the first direction D1.

The second portion P20, the fifth portion P50, the third portion P30, the fourth portion P40, and the first portion P10 are arranged in this order in the first direction D1.

Step S300 in FIG. 3 includes steps S320, S340, S360, and S380.

In step S320, the airbag 100 is folded so that the first portion P10 and the fourth portion P40 are positioned between the pair of sheet parts St130, St230 included in the third portion P30. Similarly, the airbag 100 is folded so that the second portion P20 and the fifth portion P50 are positioned between the pair of sheet parts St130, St230 included in the third portion P30. The method of folding the first portion P10 and the fourth portion P40 and the method of folding the second portion P20 and the fifth portion P50 are called "inward fold" or "tuck-in fold".

Step S320 in FIG. 3 includes steps S322, S324, S326, and S328.

In step S322, the airbag 100 is folded so that the one end T11 of the sheets St100, St200 in the first direction D1 is positioned between the pair of sheet parts St130, St230 included in the third portion P30, and further so that at least a part of the tag TG10 is positioned outside the pair of sheet parts St130, St230 arranged to overlap. In this case of folding the airbag 100, the fourth portion P40 is also positioned between the pair of sheet parts St130, St230 included in the third portion P30.

In step S324, the position of the first portion P10 positioned between the pair of sheet parts St130, St230 arranged to overlap is adjusted, based on the position and the length of the portion of the tag TG10 positioned outside the pair of sheet parts St130, St230. More specifically, an operator adjusts the position of the first portion P10 by holding the tag TG10 to move the tag TG10. Moreover, an operator adjusts the position of the first portion P10 by adjusting the portion subjected to a valley fold of the first portion P10 or the fourth portion P40.

In step S322, the airbag 100 is folded so that at least a part of the tag TG10 is positioned outside the pair of sheet parts St130, St230 arranged to overlap. This allows, in step S324, control of the position and the length of at least a part of the tag TG10 positioned outside the pair of sheet parts St130, St230 included in the third portion P30, thereby controlling the position of the first portion P10 folded between the pair of sheet parts St130, St230.

In step S326, the airbag 100 is folded so that the other end T12 of the sheets St100, St200 in the first direction D1 is positioned between the pair of sheet parts St130, St230 included in the third portion P30, and further so that at least a part of the tag TG20 is positioned outside the pair of sheet parts St130, St230 arranged to overlap. In this case of folding the airbag 100, the fifth portion P50 is also positioned between the pair of sheet parts St130, St230 included in the third portion P30.

In step S328, the position of the second portion P20 positioned between the pair of sheet parts St130, St230 arranged to overlap is adjusted, based on the position and the length of the portion of the tag TG20 positioned outside the pair of sheet parts St130, St230. The specific method of adjusting the position of the second portion P20 is the same as the method of adjusting the position of the first portion P10 in step S324.

The processes in steps S326 and S328 are executed to allow control of the position of the second portion P20 folded between the pair of sheet parts St130, St230. The processes in step S320 including steps S322 to S328 are executed, thereby allowing proper folding of the airbag 100.

Figure 5:
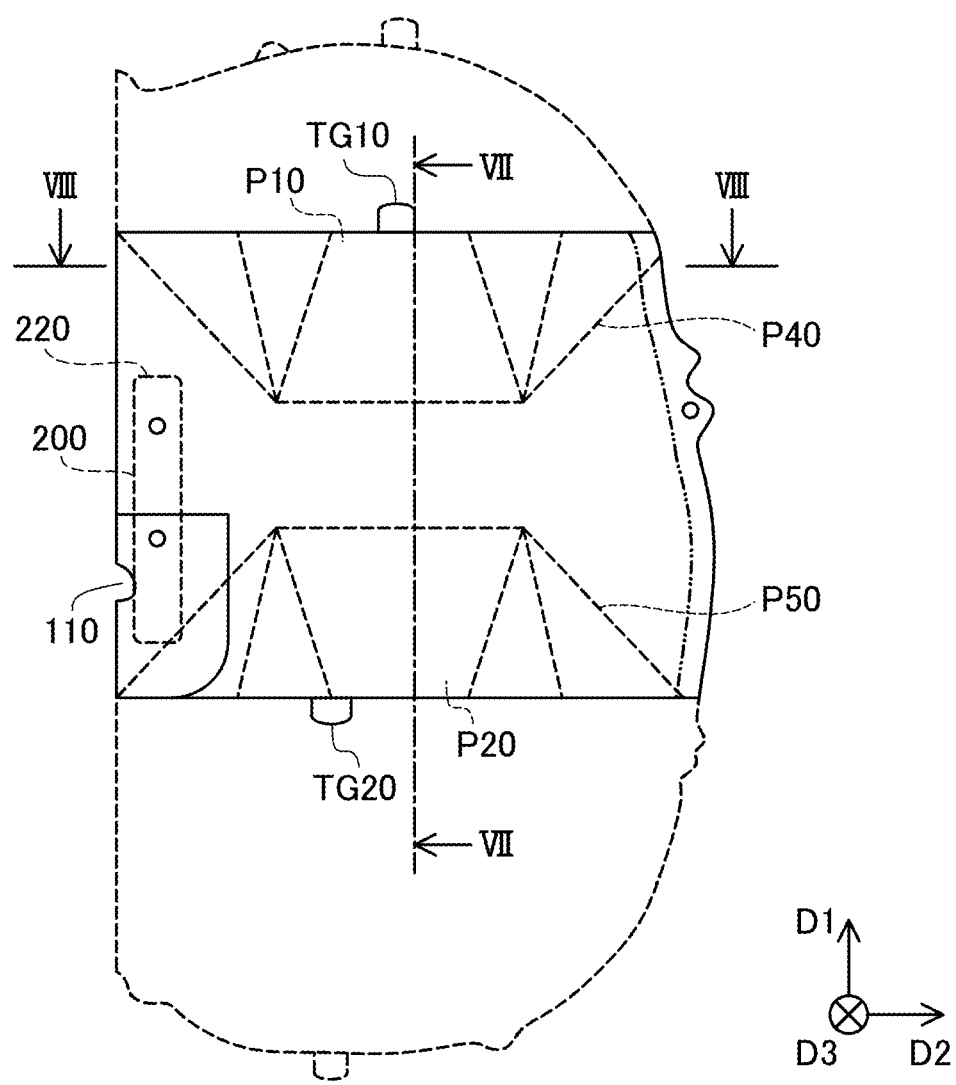
FIG. 5 is an explanatory diagram illustrating the airbag 100 when the processes in step S320 have been completed.

FIG. 5 is an explanatory diagram illustrating the airbag 100 when the processes in step S320 have been completed. FIG. 5 shows the image of the first portion P10 and the fourth portion P40 in a folded state and the image of the second portion P20 and the fifth portion P50 in a folded state, both with dashed lines.

Figure 6:
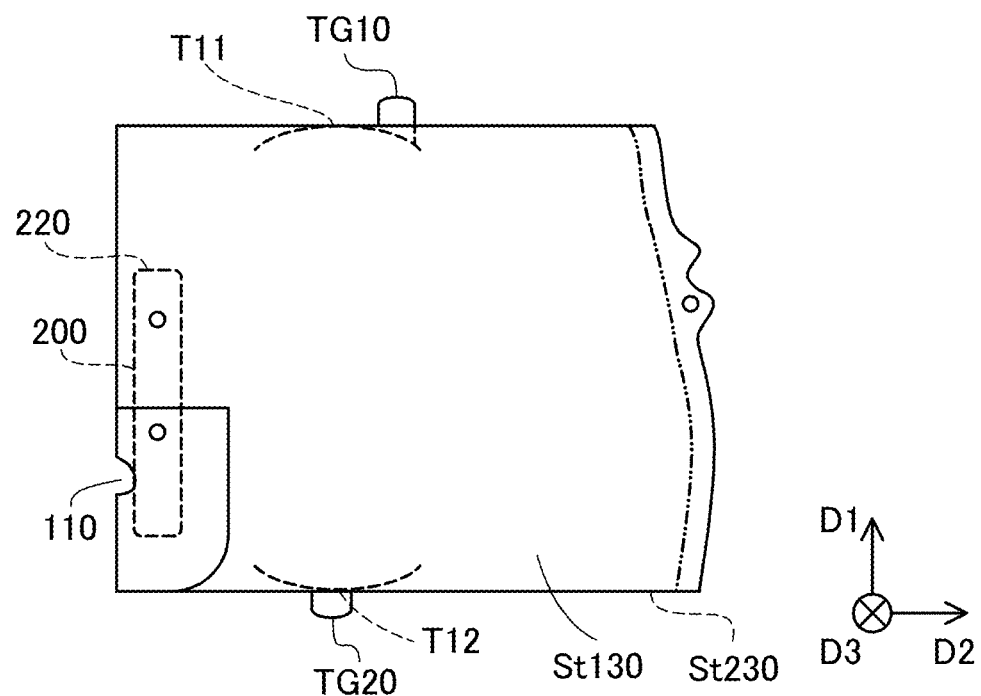
FIG. 6 is another explanatory diagram illustrating the airbag 100 when the processes in step S320 have been completed.

FIG. 6 is another explanatory diagram illustrating the airbag 100 when the processes in step S320 have been completed. FIG. 6 shows the position of the one end T11 and the position of the other end T12 of the sheets St100, St200 in the first direction D1, both with dashed lines. In FIG. 5 and FIG. 6, the tag TG10 and the tag TG20 are partially positioned outside the pair of sheet parts St130, St230.

Figure 7:
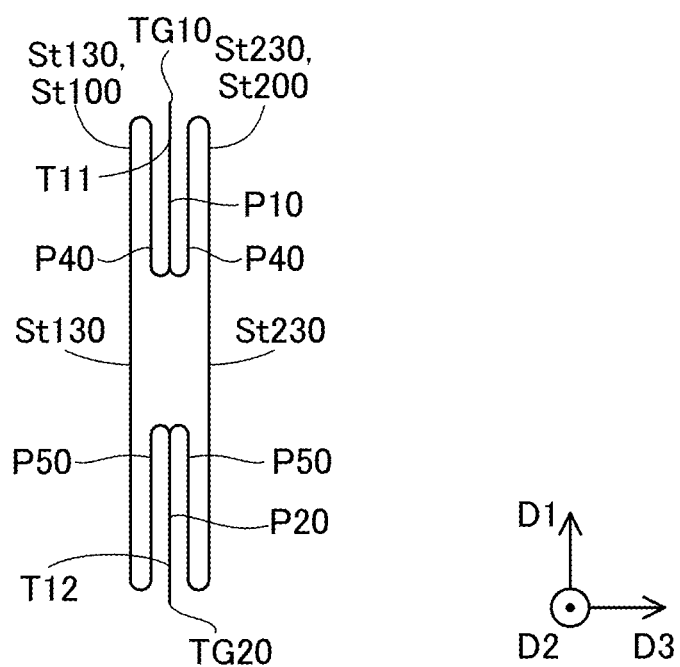
FIG. 7 is a schematic diagram corresponding to a cross-sectional view taken along a line VII-VII of FIG. 5.

FIG. 7 is a schematic diagram corresponding to a cross-sectional view taken along the line VII-VII of FIG. 5. In FIG. 7, the airbag 100 is folded in the following state. The first portion P10 and the fourth portion P40 are positioned between the pair of sheet parts St130, St230 included in the third portion P30 (refer to the center part of the upper range in FIG. 7). The one end T11 of the sheets St100, St200 in the first direction D1 is positioned between the pair of sheet parts St130, St230 included in the third portion P30. At least a part of the tag TG10 is positioned outside the pair of sheet parts St130, St230. The second portion P20 and the fifth portion P50 are positioned between the pair of sheet parts St130, St230 included in the third portion P30 (refer to the center part of the lower range in FIG. 7). The other end T12 of the sheets St100, St200 in the first direction D1 is positioned between the pair of sheet parts St130, St230 included in the third portion P30. At least a part of the tag TG20 is positioned outside the pair of sheet parts St130, St230.

Figure 8:
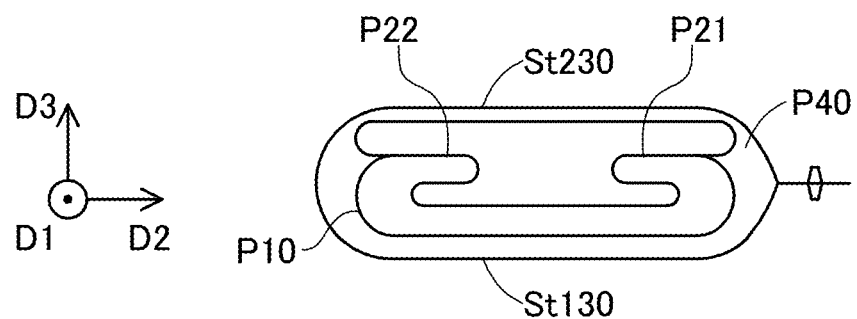
FIG. 8 is a schematic diagram corresponding to a cross-sectional view taken along a line VIII-VIII of FIG. 5.

FIG. 8 is a schematic diagram corresponding to a cross-sectional view taken along the line VIII-VIII of FIG. 5. The first portion P10 includes a part P21 including the edge part included in the end of the first portion P10 in the second direction D2. In step S326, the part P21 is folded toward the direction opposite to the second direction D2 (also refer to the part with the dashed lines of the first portion P10 in FIG. 5). The first portion P10 includes a part P22 including the edge part included in the end of the first portion P10 in the direction opposite to the second direction D2. The part P22 is folded toward the second direction D2. As a result, the first portion P10 is folded into a trapezoidal shape.

In the present aspect, the first portion P10 is folded into a small size and arranged between the pair of sheet parts St130, St230 included in the third portion P30. The present aspect provides the following effect, compared to an aspect in which the part including the edge part included in the end of the first portion P10 in the first direction D1 is folded in the direction opposite to the first direction D1. The present aspect allows the gas, which is filled between the pair of sheet parts St130, St230 included in the third portion P30, to smoothly flow toward the tip of the first portion P10 in the first direction D1, that is, toward the one end T11 of the airbag 100 in the first direction D1 (refer to the part with the dashed lines of the first portion P10 in FIG. 5). This allows more reliable and rapid deployment of the first portion P10 and the fourth portion P40 in the first direction D1.

Figure 9:
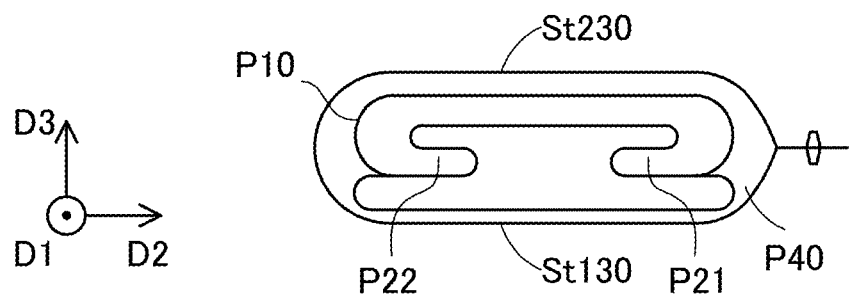
FIG. 9 is another schematic diagram corresponding to a cross-sectional view taken along the line VIII-VIII of FIG. 5.

FIG. 9 is a schematic diagram of another aspect corresponding to a cross-sectional view taken along the line VIII-VIII of FIG. 5. In FIG. 9, the parts P21, P22 of the first portion P10 are folded to the side opposite to the side shown in FIG. 8. The first portion P10 may be folded as shown in FIG. 9, unlike the aspect in FIG. 8.

In step S326, the second portion P20 is also folded in the same aspect as the first portion P10 shown FIG. 8 and FIG. 9. As a result, the second portion P20 is folded into a trapezoidal shape. The present configuration allows more reliable and rapid deployment of the second portion P20 and the fifth portion P50 in the direction opposite to the first direction D1.

The pair of sheet parts St130, St230 each has a part St131 and a part St231, respectively, which are arranged to sandwich the first portion P10, the fourth portion P40, the second portion P20, and the fifth portion P50. In step S340, the parts St131, St231, together with the first portion P10, the fourth portion P40, the second portion P20, and the fifth portion P50, are folded with a so-called accordion fold in a zigzag pattern in the second direction D2 perpendicular to the first direction D1. The meaning of being folded with an accordion fold in the second direction D2 is that a target is folded with an accordion fold so that the dimension of the target in the second direction D2 becomes smaller.

Figure 10:
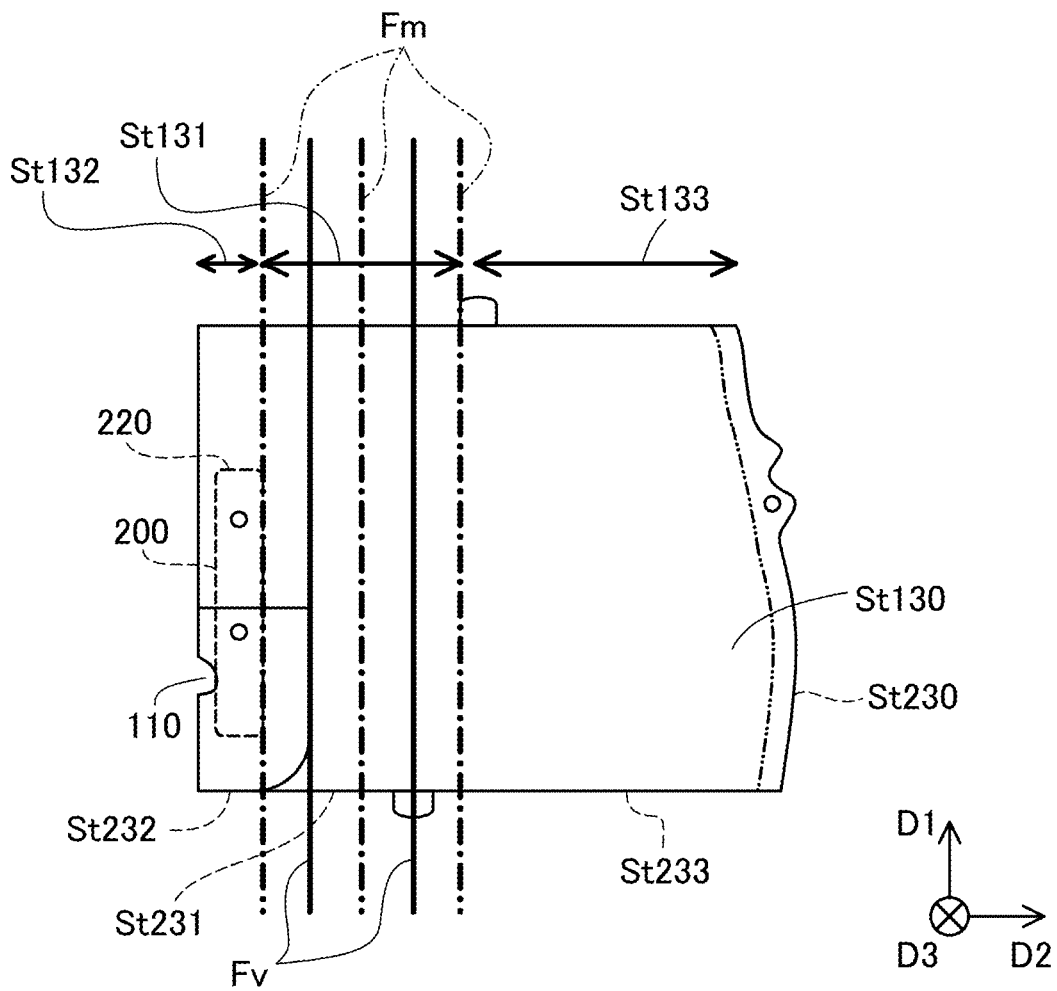
FIG. 10 is an explanatory diagram illustrating the process of step S340 in FIG. 3.

FIG. 10 is an explanatory diagram illustrating the process of step S340 in FIG. 3. In step S340, the part St131 of the sheet part St130 is folded three times with mountain folds along the first direction D1. The sheet part St130 is folded twice with valley folds along the first direction D1. There are valley creases Fv and mountain folds Fm, where each of the valley creases Fv is positioned between mountain folds Fm. The part St231 of the sheet part St230 is also folded together with the sheet part St131 of the sheet part St130. The first portion P10, the fourth portion P40, the second portion P20, and the fifth portion P50 positioned between the sheet parts St131, St231 of the sheet parts St130, St230 are also folded together with the sheet part St131 of the sheet part St130.

Figure 11:
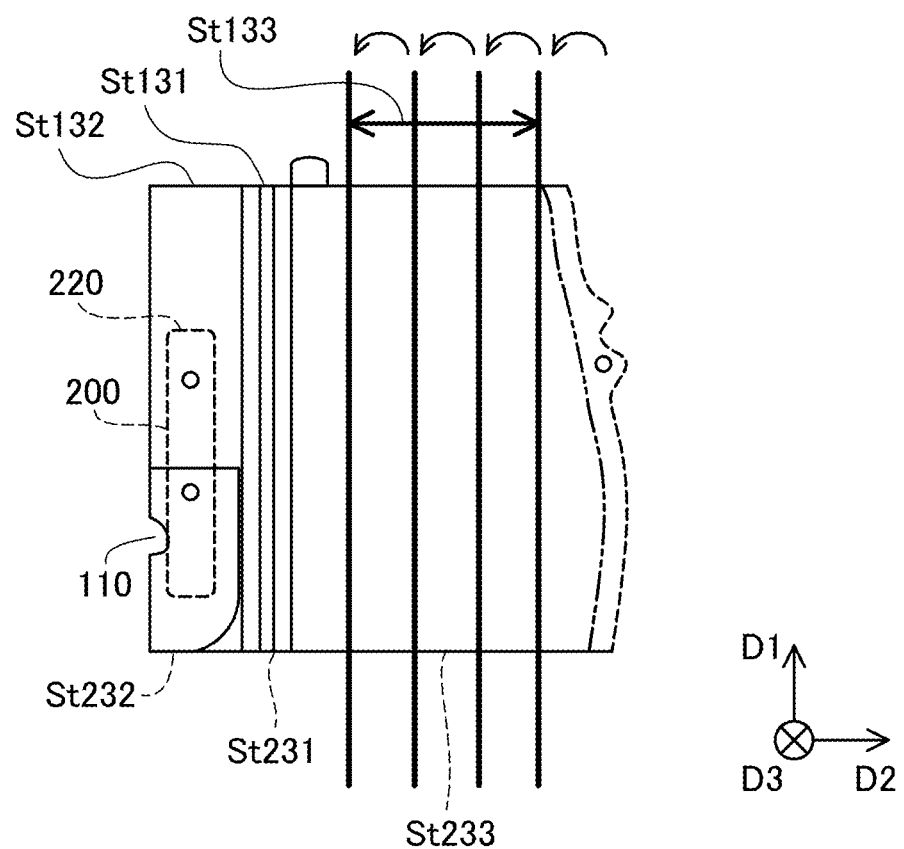
FIG. 11 is an explanatory diagram illustrating the airbag 100 when the process of step S340 has been completed.

FIG. 11 is an explanatory diagram illustrating the airbag 100 when the process of step S340 has been completed. In the state shown in FIG. 11, the airbag 100 is folded as follows. The first portion P10, the fourth portion P40, the second portion P20, and the fifth portion P50 in a folded state are positioned between the pair of sheet parts St130, St230 included in the third portion P30. Moreover, in this state, the parts St131, St231 of the pair of sheet parts St130, St230 arranged to sandwich the first portion P10, the fourth portion P40, the second portion P20, and the fifth portion P50 are folded with an accordion fold, together with the first portion P10, the fourth portion P40, the second portion P20, and the fifth portion P50, in the second direction D2 perpendicular to the first direction D1.

In this state, the supply port 220 of the inflator 200 is arranged between another part St132 and another part St232 of the pair of sheet parts St130, St230 (refer to the left-side part in FIG. 11). The another parts St132, St232 of the pair of sheet parts St130, St230 are not folded with an accordion fold.

The pair of sheet parts St130, St230 each has a yet another part St133 and a yet another part St233, respectively, in addition to the parts St131, St231 folded with an accordion fold, and the another parts St132, St232 arranged with the supply port 220 of the inflator 200 (refer to the right-side part of the upper range in FIG. 10, and the right-side part of the upper range in FIG. 11). The pair of sheet parts St130, St230 each has the another parts St132, St232, the parts St131, St231, and the yet another parts St133, St233, respectively, which are arranged sequentially in the second direction D2. The yet another parts St133, St233 of the pair of sheet parts St130, St230 are not folded with an accordion fold.

Figure 12:
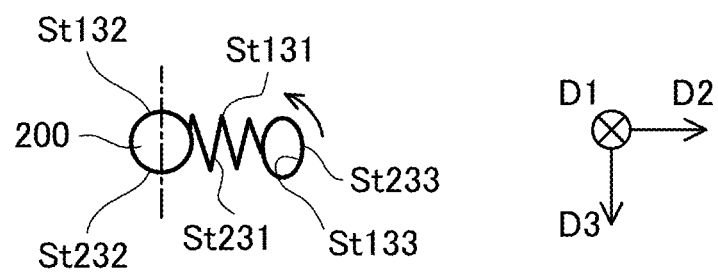
FIG. 12 is an explanatory diagram schematically illustrating the process of step S360.

FIG. 12 is an explanatory diagram schematically illustrating the process of step S360. FIG. 12 schematically shows the process of step S360 of the airbag 100 in FIG. 11 when viewed along the first direction D1. In step S360, the yet another parts St133, St233 of the pair of sheet parts St130, St230 arranged to sandwich the first portion P10, the fourth portion P40, the second portion P20, and the fifth portion P50 are rolled up, together with the first portion P10, the fourth portion P40, the second portion P20, and the fifth portion P50, in the second direction D2. The meaning of being rolled up in the second direction D2 is that a target is rolled up so that the dimension of the target in the second direction D2 becomes smaller.

Specifically, when viewed along the first direction D1, the yet another parts St133, St233 of the pair of sheet parts St130, St230 are rolled up counterclockwise with a direction in parallel to the first direction D1 as the axis of rotation. In other words, the yet another parts St133, St233 of the pair of sheet parts St130, St230 are rolled up so that the sheet facing the closest wall of the vehicle to the side airbag device 1 is wound inside.

Figure 13:
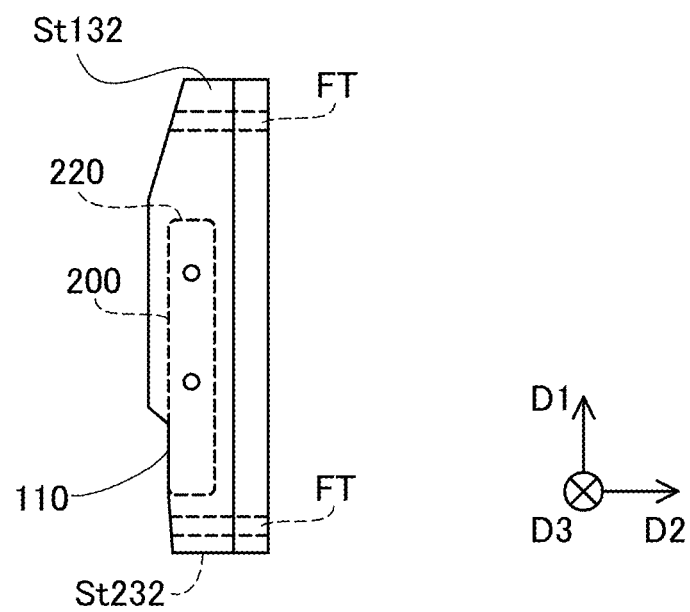
FIG. 13 is an explanatory diagram illustrating the airbag 100 when the process of step S360 has been completed.

FIG. 13 is an explanatory diagram illustrating the airbag 100 when the process of step S360 has been completed. In step S380 of FIG. 3, the folded airbag 100 is wrapped around and held by a tape FT, so that the airbag 100 is fixed in a folded state. More specifically, the folded airbag 100 is wrapped around and held by the tape FT at two portions: in the vicinity of its upper end and in the vicinity of its lower end. In FIG. 13, the positions of the airbag 100 held by the tape FT are illustrated with dashed lines. As a result, a part including the end of the inflator 200 where the supply port 220 is not arranged is exposed to the outside through the insertion port 110 provided on the airbag 100.

In step S400 of FIG. 3, the folded airbag 100 and the inflator 200 arranged partially in the airbag 100 are housed in the housing bag 300. The processes of the respective steps described above are executed, and thereby the side airbag device 1 is produced (refer to the center part of the middle range in FIG. 1). In the produced side airbag device 1, the supply port 220 of the inflator 200 is arranged between the another parts St132, St232 of the pair of sheet parts St130, St230 (refer to FIG. 13). The airbag 100 is folded in the state where the yet another parts St133, St233 of the pair of sheet parts St130, St230 are rolled up (refer to FIG. 12 and FIG. 13).

The present configuration has the following advantage, compared to an aspect in which all other portions of the pair of sheet parts St130, St230 included in the third portion P30 are folded with an accordion fold except for the another parts St132, St232 where the supply port 220 of the inflator 200 is positioned. The present configuration allows setting of the direction of deploying the airbag 100 when gas is supplied from the inflator 200 so that the direction includes a substantial component of the third direction D3, and does not significantly deviate from the second direction D2 (refer to the right-side part of the lower range in FIG. 13).

The present configuration further has the following advantage, compared to an aspect in which all other portions of the pair of sheet parts St130, St230 are rolled up except for the another parts St132, St232 where the supply port 220 of the inflator 200 is positioned. In the aspect in which all other portions are rolled up except for the another parts St132, St232 where the supply port 220 of the inflator 200 is positioned, the rolled up portions of the airbag 100 during deploying inflate largely outward while loosening, and thereafter deploy in the second direction D2. Therefore, there is a risk that the airbag 100 during deploying may come into contact with other peripheral components, causing a delay in deployment.

In the present embodiment, however, since the parts St131, St231 of the pair of sheet parts St130, St230 are folded with an accordion fold, the airbag 100 during deploying passes through a smaller space. This reduces the risk that the airbag 100 during deploying may come into contact with other peripheral components, causing a delay in deployment.

A2. Deployment of Airbag

FIG. 14 to FIG. 18 are explanatory diagrams respectively illustrating the airbag 100 of the side airbag device 1 in the course of deployment. As gas is being supplied from the inflator 200, the airbag 100 transitions step by step from the state shown in FIG. 14 to the state shown in FIG. 18. For the sake of ease of technical understanding, in the airbag 100 shown in FIG. 14 to FIG. 18, gas is not actually supplied from the inflator 200. For the sake of ease of technical understanding, the airbag 100 not equipped with the housing bag 300 is illustrated.

The side airbag device shown in FIG. 14 to FIG. 18 is arranged in the vehicle, on the side opposite to the side where the side airbag device 1 shown in FIG. 1 to FIG. 13 is arranged. Specifically, the side airbag device shown in FIG. 14 to FIG. 18 is arranged in the left seat CS on its left side, in the vehicle. The side airbag device 1 shown in FIG. 1 to FIG. 13 is arranged, on the other hand, in the right seat CS on its right side, in the vehicle. Accordingly, in the side airbag device shown in FIG. 14 to FIG. 18, the direction of rolling up the yet another parts St133, St233 of the pair of sheet parts St130, St230 is opposite to the direction of rolling up in the side airbag device 1 shown in FIG. 1 to FIG. 13. However, the same airbag deploying method is used for both the side airbag devices respectively arranged on the left side and the right side in a vehicle. Therefore, the airbag deploying method for the side airbag device 1 is described by referring to FIG. 14 to FIG. 18.

Figure 14:
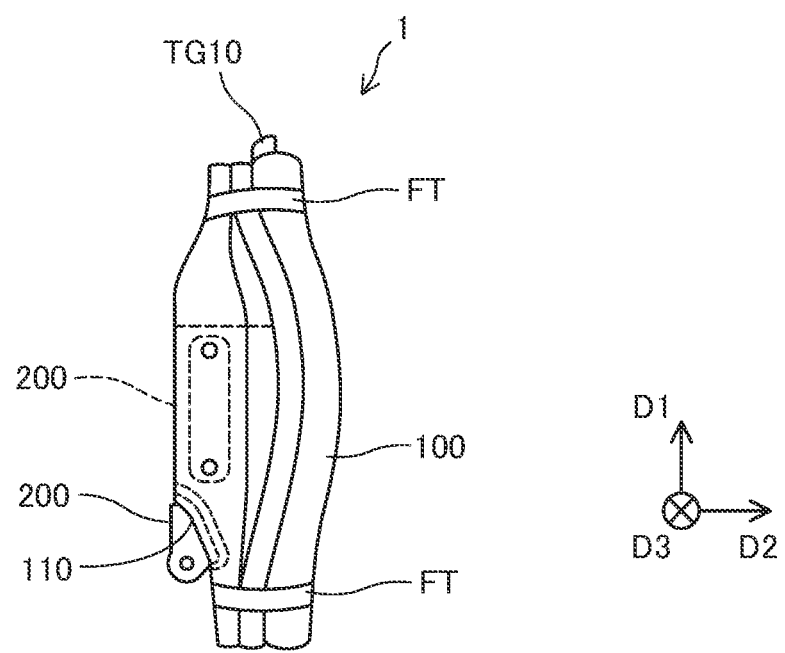
FIG. 14 is an explanatory diagram illustrating the side airbag device 1 before the airbag 100 deploys.

FIG. 14 is an explanatory diagram illustrating the side airbag device 1 before the airbag 100 deploys. In FIG. 14, the folded airbag 100 is wrapped around and held by the tape FT at two portions: in the vicinity of its upper end and in the vicinity of its lower end (refer to the portions attached with FT in FIG. 13). The part including the end of the inflator 200 where the supply port 220 of the inflator 200 is not arranged is exposed to the outside through the insertion port 110 provided on the airbag 100 (refer to the left-side part of the lower range in FIG. 14).

Figure 15:
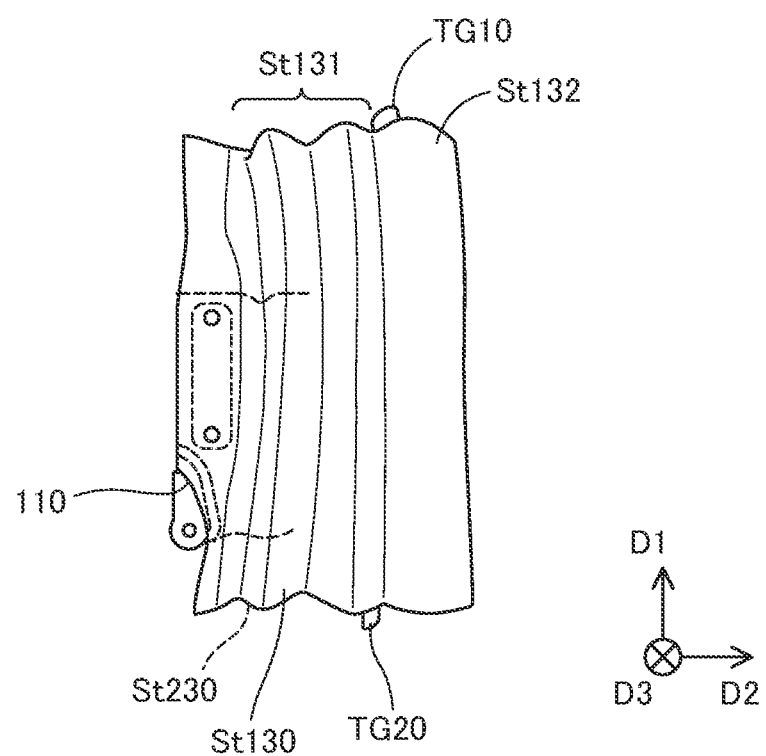
FIG. 15 is an explanatory diagram illustrating the side airbag device 1 when the airbag 100 starts deploying in a second direction D2.

FIG. 15 is an explanatory diagram illustrating the side airbag device 1 in which gas starts being supplied into the airbag 100 from the inflator 200 and the airbag 100 then starts deploying in the second direction D2. When the airbag 100 starts deploying in the second direction D2, two pieces of the tape FT are then cut out (refer to the upper range and lower range in FIG. 14). In FIG. 15, the first portion P10, the fourth portion P40, the second portion P20, and the fifth portion P50 are positioned between the sheet parts St130, St230. In other words, neither the first portion P10 nor the fourth portion P40 protrudes from the sheet parts St130, St230 in the first direction D1. Neither the second portion P20 nor the fifth portion P50 protrudes from the sheet parts St130, St230 in the direction opposite to the first direction D1.

Figure 16:
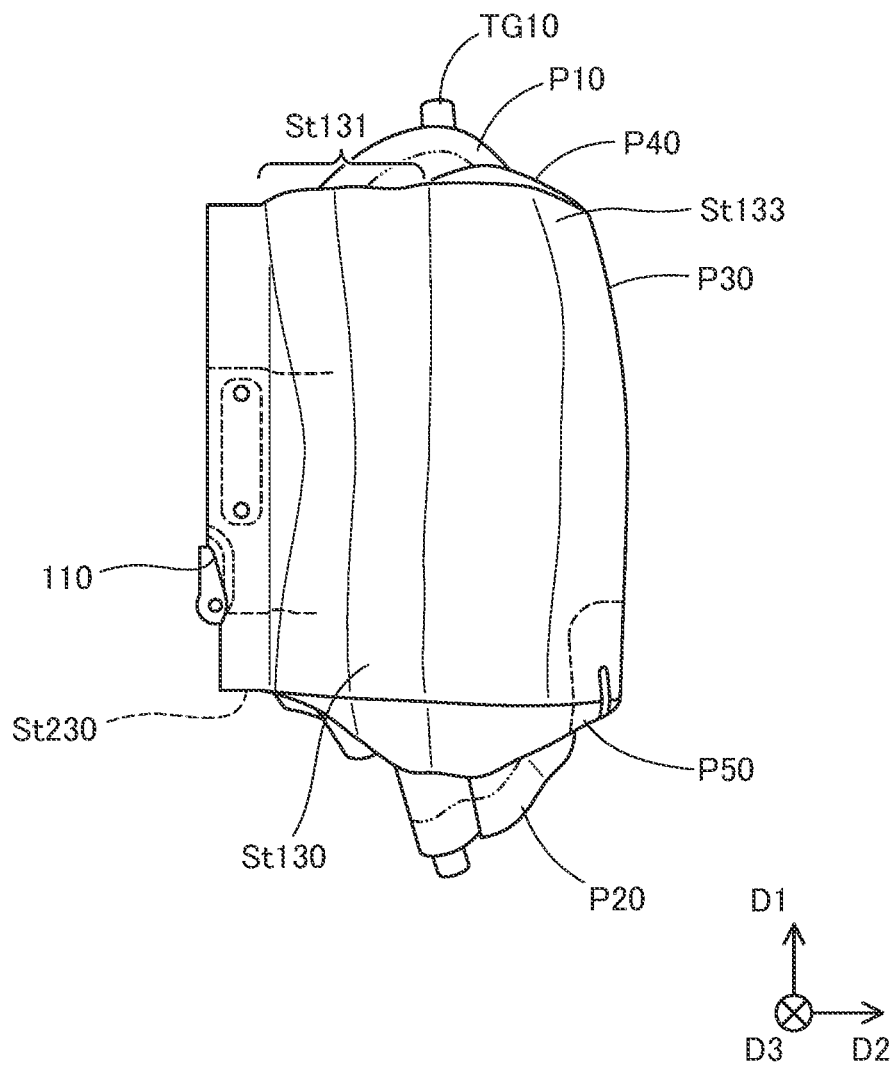
FIG. 16 is an explanatory diagram illustrating the side airbag device 1 when the airbag 100 starts deploying also in a first direction D1 in addition to the second direction D2.

FIG. 16 is an explanatory diagram illustrating the side airbag device 1 in which gas is further supplied into the airbag 100 and the airbag 100 then starts deploying also in the first direction D1 in addition to the second direction D2. In FIG. 16, both the first portion P10 and the fourth portion P40 partially protrude from the parts St131, St231 of the sheet parts St130, St230 in the first direction D1. Both the second portion P20 and the fifth portion P50 partially protrude from the parts St131, St231 of the sheet parts St130, St230 in the direction opposite to the first direction D1.

Figure 17:
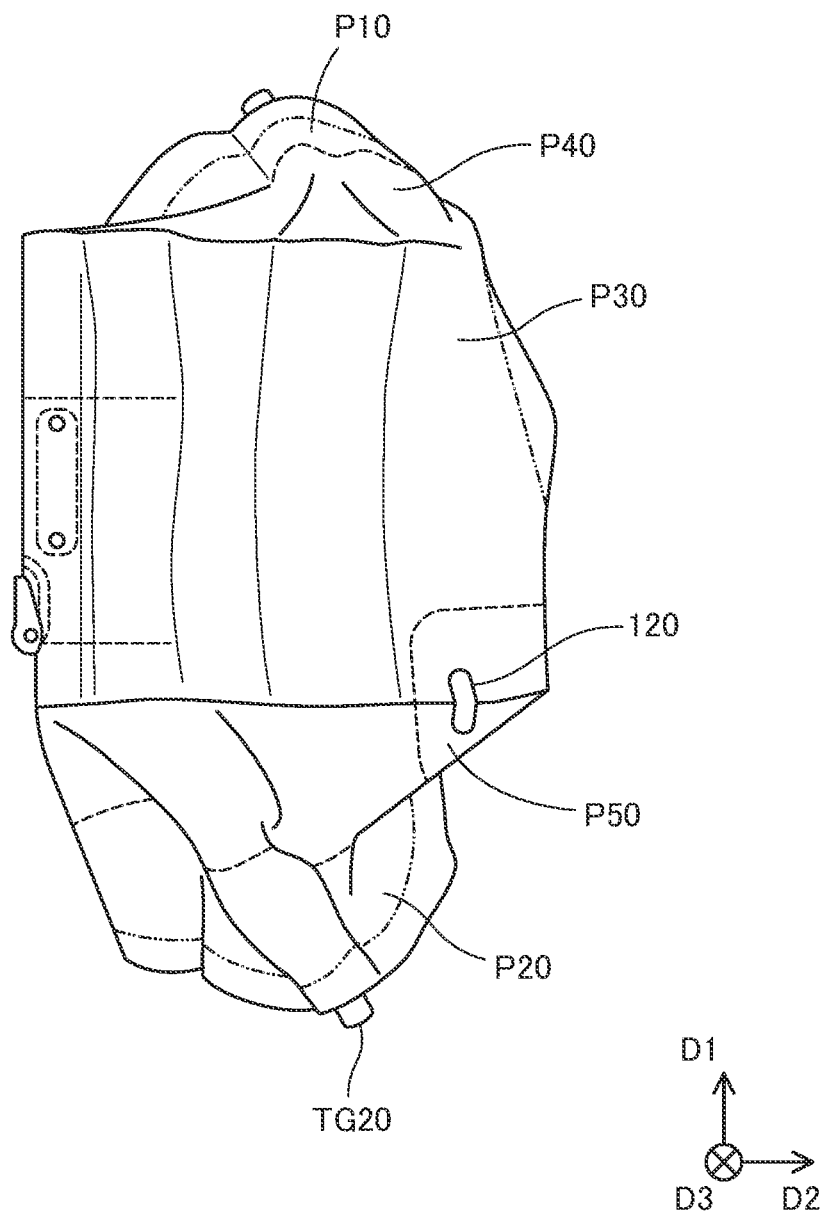
FIG. 17 is an explanatory diagram illustrating the side airbag device 1 when the airbag 100 is still deploying in the first direction D1 while it has nearly fully deployed in the second direction D2.

FIG. 17 is an explanatory diagram illustrating the side airbag device 1 in which gas is further supplied into the airbag 100 and the airbag 100 is still deploying in the first direction D1 while it has nearly fully deployed in the direction D2. In FIG. 17, both the first portion P10 and the fourth portion P40 protrude longer from the sheet parts St131, St231 of the sheet parts St130, St230 in the first direction D1, compared to the state shown in FIG. 16. Both the second portion P20 and the fifth portion P50 protrude longer from the sheet parts St131, St231 of the sheet parts St130, St230 in the direction opposite to the first direction D1, compared to the state shown in FIG. 16.

Figure 18:
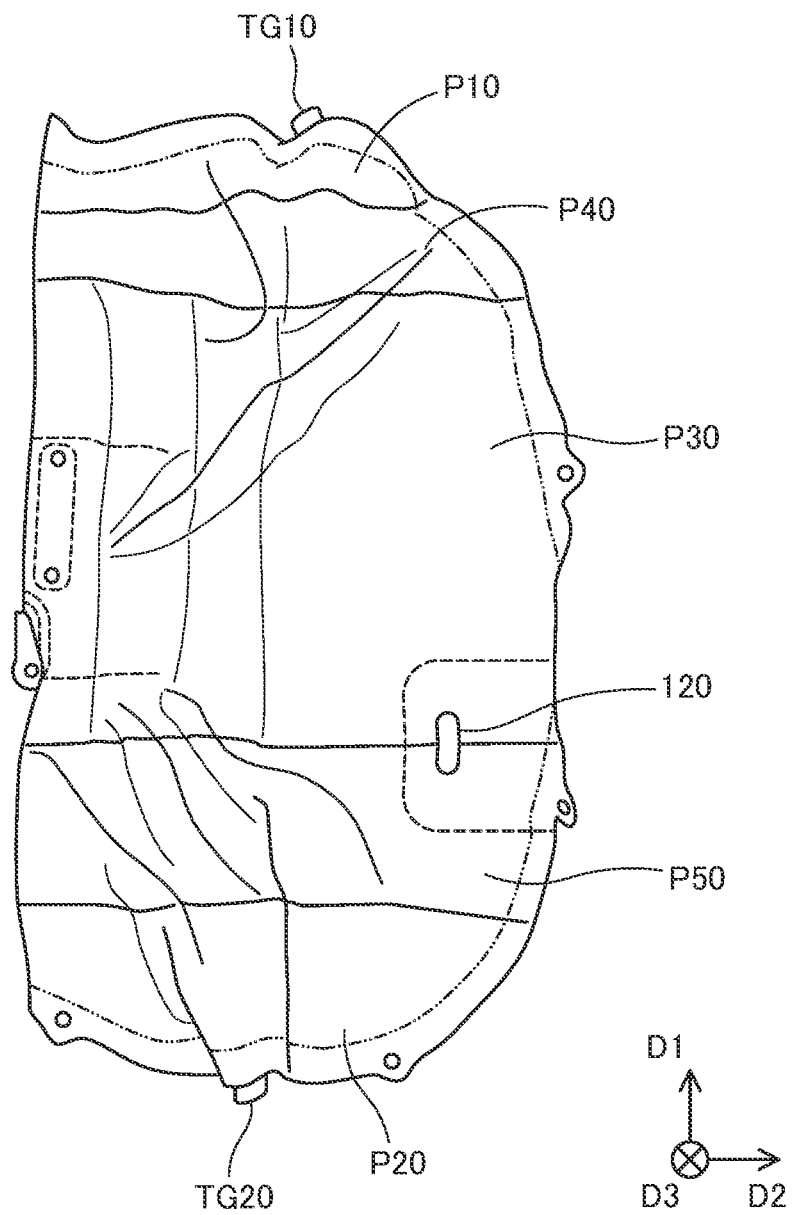
FIG. 18 is an explanatory diagram illustrating the side airbag device 1 when the airbag 100 is deployed.

FIG. 18 is an explanatory diagram illustrating the side airbag device 1 in which gas is further supplied into the airbag 100 and the airbag 100 has fully deployed. The sheet part St130 includes an exhaust port 120. With respect to the first direction D1, a part of the exhaust port 120 is positioned to the third portion P30, and another part of the exhaust port 120 is positioned to the fifth portion P50. With respect to the second direction D2, the exhaust port 120 is arranged to the yet another part St133 or the yet another part St233 of the pair of sheet parts St130, St230, subjected to rolling up. The airbag 100 fully inflates by the gas supplied from the inflator 200, and thereafter gradually deflates by exhausting the gas through the exhaust port 120.

As shown in FIG. 14 to FIG. 18, the folded airbag 100 deploys as follows. The gas supplied between the pair of sheet parts St130, St230 through the supply port 220 of the inflator 200 first extends the parts St131, St231 folded with an accordion fold, so that the airbag 100 deploys in the second direction D2 (refer to FIG. 14 and FIG. 15). Thereafter, the gas filled between the pair of sheet parts St130, St230 included in the third portion P30 pushes out the first portion P10 and the fourth portion P40 in the first direction D1, so that the airbag 100 deploys in the first direction D1. Similarly, the gas pushes out the second portion P20 and the fifth portion P50 in the direction opposite to the first direction D1, so that the airbag 100 deploys also in the direction opposite to the first direction D1 (refer to FIG. 16 to FIG. 18). The gas further extends the rolled parts St133, St233, so that the airbag 100 deploys in the second direction D2 (refer to FIG. 16 to FIG. 18).

The airbag 100 deploys as follows, in the case where the side airbag device 1 is arranged so that the extending direction Dbr of the backrest BR of the seat CS of the vehicle from the seat base SP coincides with the first direction D1 and further so that the direction Dtr where the torso TR of the occupant OC is positioned with respect to the backrest BR coincides with the second direction D2 (refer to the left-side part of the middle range in FIG. 1).

Figure 19:
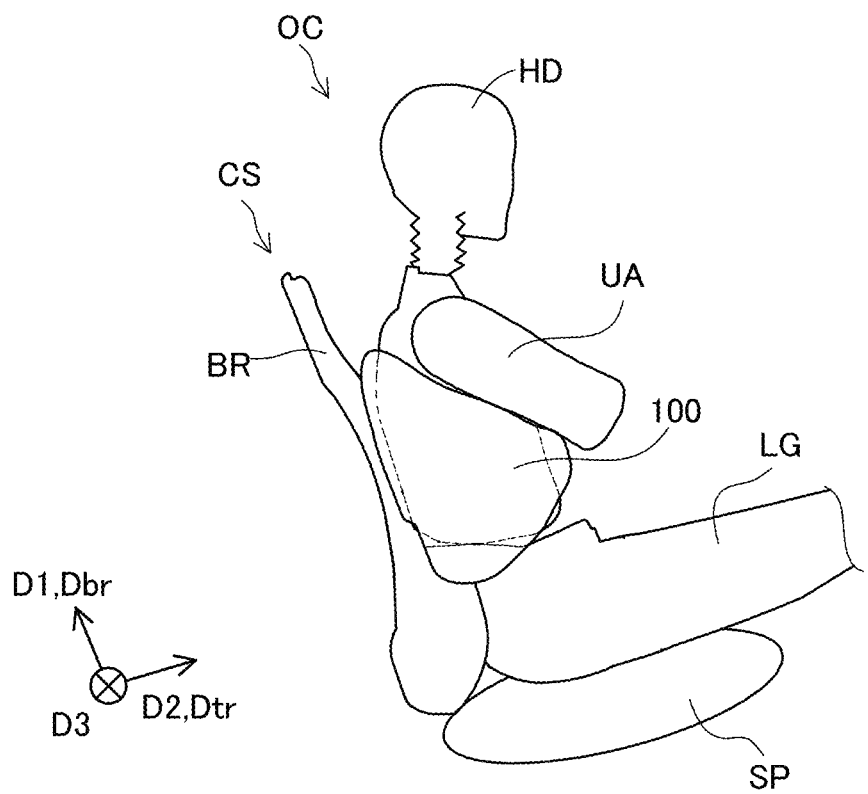
FIG. 19 is an explanatory diagram illustrating the airbag 100 in the process of deployment.

FIG. 19 is an explanatory diagram illustrating the airbag 100 in the middle of deployment. FIG. 19 shows the airbag 100 in an intermediate state between the state shown in FIG. 1 and the state shown in FIG. 2. In the process of deployment of the airbag 100, the airbag 100 first deploys in the direction Dtr where the torso TR of the occupant OC seated in the seat CS is positioned with respect to the backrest BR of the seat CS (refer to FIG. 15 and FIG. 19). The airbag 100 thereafter deploys in the extending direction Dbr of the backrest BR of the seat CS (refer to FIG. 17, FIG. 18 and FIG. 2). Therefore, the side airbag device 1 in the present embodiment allows the airbag 100 to deploy at an earlier timing in the direction Dtr where the torso TR of the occupant OC is positioned, compared to an aspect in which the airbag 100 fully deploys in the extending direction Dbr of the backrest BR and thereafter deploys in the direction Dtr where the torso TR is positioned (refer to FIG. 15 and FIG. 19). The side airbag device 1 in the present embodiment is particularly suitable for a vehicle having a small space between the occupant OC seated in the seat CS and the closest side wall of the vehicle to the seat CS.

In the present embodiment, the airbag 100, in the state where the first portion P10 and the fourth portion P40 are substantially positioned between the pair of sheet parts St130, St230 included in the third portion P30, deploys in the direction Dtr where the torso TR is positioned with respect to the backrest BR (refer to FIG. 15). Therefore, the airbag 100, during deploying, is able to push up the upper arm UA of the occupant OC from the posture of hanging down along the torso TR toward the posture of extending along the second direction D2 (refer to FIG. 1 and FIG. 19). This reduces the risk that the chest of the occupant OC may be compressed by the upper arm UA of the occupant OC via the airbag 100 after deployment due to the door or the wall deformed inward into the vehicle subjected to an external impact. This also reduces the pushing force from the outside to the chest of the occupant OC. The side airbag device 1 is configured so that the airbag 100, during deploying, comes into contact with the portion beyond the elbow and pushes up the upper arm UA, and is installed in the seat CS of the vehicle (refer to FIG. 19).

In the present embodiment, the first portion P10 and the fourth portion P40, and the second portion P20 and the fifth portion P50 are folded between the pair of sheet parts St130, St230 included in the third portion P30 (refer to FIG. 5 to FIG. 7, and FIG. 15). The present embodiment thus provides the following effect, compared to an aspect in which the first portion P10 and the fourth portion P40, and the second portion P20 and the fifth portion P50 are folded back on either one of the pair of sheet parts St130, St230 included in the third portion P30. The present embodiment allows the first portion P10 and the fourth portion P40, and the second portion P20 and the fifth portion P50 to respectively deploy in the first direction D1 and the direction opposite to the first direction D1 in the process of deployment, without moving outside the third portion P30 having inflated. This reduces the risk that the first portion P10 and the fourth portion P40, during deploying, may come into contact with other peripheral components such as a side wall of the vehicle, causing a delay in deployment. The side airbag device 1 in the present embodiment is particularly suitable for a vehicle having a small space between the side airbag device 1 installed in the seat CS and the closest side wall of the vehicle to the seat CS.

In the side airbag device 1 in the present embodiment, when the airbag 100 with the pair of sheets St100, St200 deployed in a flat shape is viewed along the thickness direction D3, the dimension Dm1 of the airbag 100 in the first direction D1 is longer than the dimension Dm2 of the airbag 100 in the second direction D2 (refer to FIG. 4).

The present configuration allows protection of the occupant OC seated in the seat CS in a wide range, by deploying the airbag 100 in the second direction D2 while pushing up the upper arm UA, and thereafter deploying the airbag 100 in the first direction D1 (refer to FIG. 1, FIG. 19, and FIG. 2).

The vehicle in the present embodiment is also called "moving body".

B. Other Embodiments

B1. Other Embodiments 1

(1) In the embodiment described above, the backrest BR of the seat CS in which the side airbag device 1 is installed includes an independent skeleton (refer to FIG. 1, FIG. 2 and FIG. 19). Alternatively, the backrest BR of the seat CS in which the side airbag device 1 is installed may be provided integrally with a wall of a moving body, or may share its structure for withstanding external forces with a wall of a moving body.

(2) In the embodiment described above, the airbag 100 is folded so that at least a part of the tag TG10 is positioned outside the pair of sheet parts St130, St230 arranged to overlap (refer to FIG. 5 to FIG. 7). Alternatively, the airbag 100 may be folded so that the tag TG10 is always positioned entirely outside the pair of sheet parts St130, St230 arranged to overlap. Similarly, the airbag 100 may be folded so that the tag TG20 is always positioned entirely outside the pair of sheet parts St130, St230 arranged to overlap.

(3) In the embodiment described above, the airbag 100 is folded so that the first portion P10 is positioned between the pair of sheet parts St130, St230 included in the third portion P30 (refer to FIG. 5 to FIG. 7). Alternatively, the airbag 100 may be folded so that the first portion P10 is partially positioned outside the pair of sheet parts St130, St230. Similarly, the airbag 100 may be folded so that the second portion P20 is partially positioned outside the pair of sheet parts St130, St230.

(4) In the embodiment described above, the airbag 100 includes the sheets St100, St200 which are provided facing each other and connected to each other (refer to FIG. 4). Alternatively, a pair of sheets included in an airbag may be two independent sheets, or may be two parts which are one sheet folded in half and face each other. For example, the insertion port 110 may be provided to the crease part of one sheet folded in half (refer to the left-side part of the middle range in FIG. 4).

(5) In the embodiment described above, the part St131 of the sheet part St130 is folded three times with mountain folds along the first direction D1. The part St131 of the sheet part St130 is folded twice with valley folds along the first direction D1 (refer to FIG. 11 and FIG. 12). Alternatively, regarding an accordion fold, an airbag may be folded twice or less with mountain folds, or folded four times or more. Respective valley creases are preferably positioned between mountain folds.

(6) In the embodiment described above, the airbag 100 is folded so that the second portion P20 and the fifth portion P50 are positioned between the pair of sheet parts St130, St230 included in the third portion P30 (refer to FIG. 5 to FIG. 7). Alternatively, the airbag 100 may be folded so that the second portion P20 and the fifth portion P50 are positioned outside the pair of sheet parts St130, St230. The present aspect allows the accordion fold in which the second portion P20 and the fifth portion P50 are positioned outside the pair of sheet parts St130, St230.

(7) In the embodiment described above, the airbag 100 is included in the side airbag device 1. The side airbag device 1 is installed in the seat CS of the vehicle (refer to the center part of the middle range in FIG. 1). A seat in which a side airbag device is installed may be arranged side by side with a door in a moving body, or may be arranged side by side with a portion of a wall of a moving body where a door is not provided.

(8) In the embodiment described above, the airbag 100 is included in the side airbag device 1. The side airbag device 1 deploys the airbag 100 between the occupant OC seated in the seat CS of the vehicle and the closest side wall of the vehicle to the seat CS when the vehicle is subjected to an external impact. Alternatively, the airbag in the present disclosure may be deployed between a pair of the seats arranged side by side in the direction perpendicular to the advancing direction of a moving body. In other words, the airbag in the present disclosure may be included in a far-side airbag device. In the present aspect, the far-side airbag device may be installed in the side part of at least one of the pair of seats arranged side by side, the side part facing the side part of the other seat.

(9) In the embodiment described above, the side airbag device 1 is installed in the seat CS of the vehicle (refer to the center part of the middle range in FIG. 1). Alternatively, the side airbag device 1 may be installed in a moving body other than a vehicle, for example, a vessel, an airplane, a train, a spacecraft, or a satellite.

(10) In the embodiment described above, in step S200, the inflator 200 is attached to the airbag 100. Then in step S300, the airbag 100 is folded (refer to FIG. 3). Alternatively, after the airbag 100 is folded, the inflator 200 may be attached to the airbag 100.

(11) In the embodiment described above, the yet another parts St133, St233 of the pair of sheet parts St130, St230 are rolled up so that the sheet facing the closest wall of the vehicle to the side airbag device 1 is wound inside (refer to FIG. 12). Alternatively, the yet another parts St133, St233 of the pair of sheet parts St130, St230 may be rolled up so that the sheet on the side opposite to the sheet facing the closest wall of the vehicle to the side airbag device 1 is wound inside. In other words, they may be rolled up clockwise when viewed along the first direction D1.

B2. Other Embodiment 2

In the side airbag device 1 in the embodiment described above, the airbag 100 is folded so that the yet another parts St133, St233 of the pair of sheet parts St130, St230 are rolled up (refer to FIG. 12 and FIG. 13). Alternatively, a side airbag device may be configured with a folded airbag having no portion rolled up. In the present aspect, the side airbag device may be configured with the airbag, in its folded state, at least partially folded with an accordion fold.

B3. Other Embodiment 3

In the side airbag device 1 in the embodiment described above, the part P21, which includes the edge part included in the end of the first portion P10 in the second direction D2, is folded toward the direction opposite to the second direction D2 (refer to FIG. 5, FIG. 8, and FIG. 9). The part P22, which includes the edge part included in the end of the first portion P10 in the direction opposite to the second direction D2, is folded toward the second direction D2. Alternatively, a first portion of an airbag may be folded with a tuck-in fold between the pair of sheet parts St130, St230, instead of being folded toward the second direction D2.

B4. Other Embodiment 4

In the side airbag device 1 in the embodiment described above, the airbag 100 is folded so that at least a part of the tag TG10 is positioned outside the pair of sheet parts St130, St230 arranged to overlap (refer to FIG. 5 to FIG. 7). Alternatively, a side airbag device may be configured without such a tag. In the present aspect, for example, the airbag 100 may be folded so that the first portion P10 is partially positioned outside the pair of sheet parts St130, St230 arranged to overlap. The airbag 100 may be folded so that neither a tag nor the first portion P10 is partially positioned outside the pair of sheet parts St130, St230 arranged to overlap.

B5. Other Embodiment 5

In the side airbag device 1 in the embodiment described above, the dimension Dm1 of the airbag 100 in the first direction D1 is longer than the dimension Dm2 of the airbag 100 in the second direction D2 (refer to FIG. 4). Alternatively, the dimension Dm1 of the airbag 100 in the first direction D1 may be shorter than the dimension Dm2 of the airbag 100 in the second direction D2, or may be the same length as the dimension Dm2 of the airbag 100 in the second direction D2.

The present disclosure may be implemented by aspects described below.

(1) In one aspect of the present disclosure, a side airbag device is provided. The side airbag device includes an airbag in a folded state, including a pair of sheets provided facing each other and connected to each other, and an inflator including a supply port for supplying gas and configured to supply gas into the airbag. When the airbag is viewed along a thickness direction of the pair of sheets, with the pair of sheets deployed in a flat shape, the airbag includes a first portion including one end of the sheets in a first direction, a second portion including the other end of the sheets in the first direction, a third portion positioned between the first portion and the second portion in the first direction, and a fourth portion positioned between the first portion and the third portion in the first direction. The airbag is folded into the following states: (i) a state with at least a part of the first portion and the fourth portion positioned between a pair of sheet parts corresponding to a part of the pair of sheets and included in the third portion, and (ii) a state with a part of the pair of sheet parts arranged to sandwich the at least part of the first portion and the fourth portion, folded with an accordion fold in a second direction perpendicular to the first direction, together with the at least part of the first portion and the fourth portion. The supply port is arranged between another part of the pair of sheet parts.

In the aspect above, the folded airbag deploys as follows. First, the gas supplied between the pair of sheet parts through the supply port of the inflator extends the part folded with the accordion fold, so that the airbag deploys in the second direction. Thereafter, the gas filled between the pair of sheet parts included in the third portion pushes out the first portion and the fourth portion in the first direction, so that the airbag deploys in the first direction. In the case of the side airbag device arranged so that the extending direction of a backrest of a seat of a moving body substantially coincides with the first direction, the airbag deploys as follows. The airbag deploys first in the direction where the torso of an occupant seated in the seat is positioned with respect to the backrest of the seat. The airbag deploys thereafter in the extending direction of the backrest of the seat. Accordingly, the side airbag device in the present aspect allows the airbag to deploy at an earlier timing in the direction where the torso of the occupant is positioned, compared to an aspect in which an airbag fully deploys in an extending direction of a backrest of a seat and thereafter deploys in the direction where the torso of an occupant is positioned.

In the present aspect, the airbag, in the state where the first portion and the fourth portion are substantially positioned between the pair of sheet parts included in the third portion, deploys in the direction where the torso of the occupant is positioned with respect to the backrest of the seat. Therefore, the airbag, during deploying, is able to push up the upper arm of the occupant from the posture of hanging down along the torso toward the posture of extending along the second direction. This reduces the risk that the chest of the occupant may be compressed by the upper arm of the occupant via the airbag due to a door or a wall of a moving body deformed inward into the moving body subjected to an external impact. Moreover, the present aspect allows the first portion and the fourth portion to deploy in the first direction without moving outside the third portion having inflated, during deploying, compared to an aspect in which a first portion and a fourth portion are folded back on either one of the pair of sheet parts included in the third portion. This reduces the risk that, during deploying, the first portion and the fourth portion may come into contact with other peripheral components, causing a delay in deployment.

(2) In the side airbag device in the aspect above, the pair of sheet parts may include a yet another part. When the pair of sheet parts deployed in a flat shape is viewed along the thickness direction, the another part, the part, and the yet another part may be arranged sequentially in the second direction. The airbag may be folded, with the yet another part in a rolled-up state.

The present aspect has the following advantage, compared to an aspect in which all other portions of a pair of sheet parts included in a third portion are folded with an accordion fold except for another part where a supply port of an inflator is positioned. The present aspect allows setting of the direction of deploying the airbag when gas is supplied from the inflator so that the direction includes a substantial component of the third direction perpendicular to the first direction and the second direction, and does not significantly deviate from the second direction.

The present aspect further has the following advantage, compared to an aspect in which all other portions of a pair of sheet parts are rolled up except for another part where a supply port of an inflator is positioned. In the present aspect, the airbag, during deploying, passes through a smaller space. This reduces the risk that the airbag, during deploying, may come into contact with other peripheral components, causing a delay in deployment.

(3) In the side airbag device in the aspect above, with respect to the airbag, a part including an edge part included in an end of the first portion in the second direction may be folded toward a direction opposite to the second direction.

In the present aspect, the first portion may be folded into a small size and arranged between the pair of sheet parts included in the third portion. Moreover, compared to an aspect in which a part including an edge part included in an end of a first portion in a first direction is folded toward a direction opposite to the first direction, the present aspect allows the gas, which is filled between the pair of sheet parts included in the third portion, to smoothly flow toward the tip of the first portion in the first direction, that is, toward the one end of the airbag in the first direction. This allows more reliable and rapid deployment of the first portion and the fourth portion.

(4) In the side airbag device in the aspect above, the airbag may include a tag attached to the first portion so as to protrude in the first direction. The airbag may be folded so that the one end of the sheets in the first direction is positioned between the pair of sheet parts included in the third portion, and further so that at least a part of the tag is positioned outside the pair of sheet parts.

In the present aspect, the position of the first portion folded between the pair of sheet parts may be controlled by adjusting the position and the length of the at least part of the tag positioned outside the pair of sheet parts included in the third portion in the process of folding the airbag. This allows proper folding of the airbag.

(5) In the side airbag device in the aspect above, when the airbag with the pair of sheets deployed in a flat shape is viewed along the thickness direction, a dimension of the airbag in the first direction may be longer than a dimension of the airbag in the second direction.

In the present aspect, the airbag during deploying in the second direction pushes up the upper arm, and thereafter deploys in the first direction, thereby allowing protection of the occupant seated in the seat in a wide range.

(6) In another aspect of the present disclosure, a method of folding an airbag included in a side airbag device is provided. The airbag includes a pair of sheets provided facing each other and connected to each other. When the airbag is viewed along a thickness direction of the pair of sheets, with the pair of sheets deployed in a flat shape, the airbag includes a first portion including one end of the sheets in a first direction, a second portion including the other end of the sheets in the first direction, a third portion positioned between the first portion and the second portion in the first direction, and a fourth portion positioned between the first portion and the third portion in the first direction. The method includes the following steps: (i) folding the airbag so that at least a part of the first portion and the fourth portion are positioned between a pair of sheet parts corresponding to a part of the pair of sheets and included in the third portion, and (ii) folding, with an accordion fold, a part of the pair of sheet parts arranged to sandwich the at least part of the first portion and the fourth portion, together with the at least part of the first portion and the fourth portion in a second direction perpendicular to the first direction.

(7) In the method of folding the airbag in the aspect above, the airbag may include a tag attached to the first portion so as to protrude in the first direction. The step (i) may include the steps of folding the airbag so that the one end of the sheets in the first direction is positioned between the pair of sheet parts included in the third portion, and further so that at least a part of the tag is positioned outside the pair of sheet parts, and adjusting a position of the first portion positioned between the pair of sheet parts, based on a position and a length of the at least part of the tag positioned outside the pair of sheet parts.

The present disclosure may be embodied in various aspects other than the side airbag device and the airbag folding method, specifically, a far-side airbag device, a curtain airbag device, a method of producing such an airbag device, and a method of folding an airbag included in such an airbag device.

The present disclosure may be embodied in various configurations without departing from the spirit of the present disclosure, not limited to the above-described embodiments. For example, the technical features in the embodiments corresponding to the technical features in the respective aspects disclosed in the summary above may be appropriately replaced or combined in order to solve some or all of the above-described problems, or in order to achieve some or all of the above-described effects. Any of the technical features not described as essential in the present specification may be omitted appropriately.

What is claimed is:

1. A side airbag device comprising:
an airbag including a pair of sheets provided facing each other and connected to each other, the airbag folded; and
an inflator including a supply port for supplying gas, the inflator configured to supply gas into the airbag, wherein
when the airbag is viewed along a thickness direction of the pair of sheets, with the pair of sheets deployed in a flat shape, the airbag includes:
a first portion including one end of the sheets in a first direction;
a second portion including the other end of the sheets in the first direction;
a third portion positioned between the first portion and the second portion in the first direction; and
a fourth portion positioned between the first portion and the third portion in the first direction, wherein
the airbag is folded into the following states: (i) a state with at least a part of the first portion and the fourth portion positioned between a pair of sheet parts corresponding to a part of the pair of sheets, the pair of sheet parts included in the third portion, and (ii) a state with a part of the pair of sheet parts arranged to sandwich the at least part of the first portion and the fourth portion, folded with an accordion fold in a second direction perpendicular to the first direction, together with the at least part of the first portion and the fourth portion, and
the supply port is arranged between another part of the pair of sheet parts.

2. The side airbag device according to claim 1, wherein the pair of sheet parts includes a yet another part,
when the pair of sheet parts deployed in a flat shape is viewed along the thickness direction, the another part, the part, and the yet another part are arranged sequentially in the second direction, and
the airbag is folded, with the yet another part in a rolled-up state.

3. The side airbag device according to claim 1, wherein in the airbag, a part including an edge part included in an end of the first portion in the second direction is folded toward a direction opposite to the second direction.

4. The side airbag device according to claim 1, wherein the airbag includes a tag attached to the first portion so as to protrude in the first direction, and
the airbag is folded so that the one end of the sheets in the first direction is positioned between the pair of sheet parts included in the third portion, and further so that at least a part of the tag is positioned outside the pair of sheet parts.

5. The side airbag device according to claim 1, wherein when the airbag with the pair of sheets deployed in a flat shape is viewed along the thickness direction, a dimension of the airbag in the first direction is longer than a dimension of the airbag in the second direction.

6. A method of folding an airbag included in a side airbag device,
the airbag including a pair of sheets provided facing each other and connected to each other, wherein
when the airbag is viewed along a thickness direction of the pair of sheets, with the pair of sheets deployed in a flat shape, the airbag includes:
a first portion including one end of the sheets in a first direction;
a second portion including the other end of the sheets in the first direction;
a third portion positioned between the first portion and the second portion in the first direction; and
a fourth portion positioned between the first portion and the third portion in the first direction, wherein
the method comprising:
(i) folding the airbag so that at least a part of the first portion and the fourth portion are positioned between a pair of sheet parts corresponding to a part of the pair of sheets, the pair of sheet parts included in the third portion; and
(ii) folding, with an accordion fold, a part of the pair of sheet parts arranged to sandwich the at least part of the first portion and the fourth portion, together with the at least part of the first portion and the fourth portion in a second direction perpendicular to the first direction.

7. The method of folding the airbag according to claim 6, wherein
the airbag includes a tag attached to the first portion so as to protrude in the first direction,
the step (i) includes the steps of:
folding the airbag so that the one end of the sheets in the first direction is positioned between the pair of sheet parts included in the third portion, and further so that at least a part of the tag is positioned outside the pair of sheet parts; and
adjusting a position of the first portion positioned between the pair of sheet parts, based on a position and a length of the at least part of the tag positioned outside the pair of sheet parts.

* * * * *